(12) United States Patent
Yu

(10) Patent No.: US 10,746,490 B1
(45) Date of Patent: Aug. 18, 2020

(54) GUN LOCK AND A FIREARM USING THE GUN LOCK

(71) Applicant: Yicheng Yu, Shanghai (CN)

(72) Inventor: Yicheng Yu, Shanghai (CN)

( * ) Notice: Subject to any disclaimer, the term of this patent is extended or adjusted under 35 U.S.C. 154(b) by 61 days.

(21) Appl. No.: 16/297,409

(22) Filed: Mar. 8, 2019

(51) Int. Cl.
*F41A 17/06* (2006.01)
*F41A 17/46* (2006.01)

(52) U.S. Cl.
CPC ............. *F41A 17/066* (2013.01); *F41A 17/46* (2013.01)

(58) Field of Classification Search
CPC ........ F41A 17/066; F41A 17/22; F41A 17/06; F41A 17/46
See application file for complete search history.

(56) References Cited

U.S. PATENT DOCUMENTS

| | | | |
|---|---|---|---|
| 9,651,325 B1* | 5/2017 | Gant | F41A 17/066 |
| 2017/0160041 A1* | 6/2017 | Stewart | H04N 7/188 |
| 2017/0284754 A1* | 10/2017 | Chakraborty | H04N 5/232 |
| 2018/0224231 A1* | 8/2018 | Weinberg | F41A 17/46 |
| 2019/0145725 A1* | 5/2019 | Murphy, II | F41A 17/54 42/70.11 |
| 2019/0186868 A1* | 6/2019 | Cordero Pardo | F41C 33/029 |
| 2019/0301823 A1* | 10/2019 | Murphy, II | F41C 23/16 |
| 2019/0376756 A1* | 12/2019 | Nieh | F41A 17/063 |
| 2020/0003511 A1* | 1/2020 | Deng | F41A 17/066 |
| 2020/0011629 A1* | 1/2020 | Deng | F41A 17/066 |
| 2020/0049439 A1* | 2/2020 | Thompson | F41A 17/54 |
| 2020/0109905 A1* | 4/2020 | Black | F41A 17/066 |
| 2020/0132404 A1* | 4/2020 | Adam Kemp | F41A 17/066 |

* cited by examiner

*Primary Examiner* — Michelle Clement
(74) *Attorney, Agent, or Firm* — Patent Masters LLC; Rui Wu

(57) ABSTRACT

A gun lock of a firearm, the gun lock comprising: a plurality of sensors configured to collect profile information of a user of the firearm; a computing system coupled to the plurality of sensors, the computing system configured to determine whether the user of the firearm is authorized to operate the firearm based on the profile information of the user of the firearm and pre-stored authorized profile database; an actuator coupled to the computing system; a first connecting structure mechanically coupled to the actuator; a second connecting structure mechanically coupled to the first connecting structure; and a third connecting structuring mechanically coupled to the second connecting structure, wherein the computing system is configured to generate a control instruction following determining whether the user of the firearm is authorized to operate the firearm, and the computing system is further configured to transmit the control instruction to the actuator.

20 Claims, 5 Drawing Sheets

GUN LOCK AND A FIREARM USING THE GUN LOCK

BACKGROUND

1. Technical Field

The present disclosure relates generally to an apparatus and a method related to performing locking and unlocking mechanism on a firearm. In particular, the present disclosure relates to a gun lock and a firearm using the gun lock to prevent the firearm from being used by unauthorized users.

2. Discussion of Technical Background

Firearm abuse has become an increasingly important problem in the United States and the world. Reasons for firearm abuse includes the unauthorized use of the firearm, where the firearm abusers are not the actual owner of the firearm and do not have permission of actually using the firearm. Such firearm abusers include, but are not limited to, an actual owner's child who may take the firearm without the actual owner's awareness, a thief who steals the firearm, and a robber who violently takes away the firearm from the actual owner. Therefore, there exists a need for a gun lock that can be used in the firearm and make sure that only the authorized users determined by the actual owner or preceded authorized users of the firearm, including but not limited to the actual owner himself, can operate the firearm.

SUMMARY

In an exemplary embodiment, there is provided an apparatus comprising: a gun lock of a firearm, the gun lock comprising: a plurality of sensors configured to collect profile information of a user of the firearm; a computing system coupled to the plurality of sensors, the computing system configured to determine whether the user of the firearm is authorized to operate the firearm based on the profile information of the user of the firearm and pre-stored authorized profile database; an actuator coupled to the computing system; a first connecting structure mechanically coupled to the actuator; a second connecting structure mechanically coupled to the first connecting structure; and a third connecting structuring mechanically coupled to the second connecting structure, wherein the computing system is further configured to generate a control instruction following determining whether the user of the firearm is authorized to operate the firearm, the computing system is further configured to transmit the control instruction to the actuator, wherein a first end of the first connecting structure is mechanically coupled to the actuator, the actuator being configured to cause movement of the first end of the first connecting structure toward a first direction or opposite to the first direction based on the control instruction received from the computing system, wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction, wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and wherein the second end of the third connecting structure does not block the pathway of the trigger of the firearm after the actuator causes the first end of the first connecting structure to move toward the first direction.

In an exemplary embodiment, there is provided a firearm with a gun lock, the gun lock comprising: a plurality of sensors configured to collect profile information of a user of the firearm; a computing system coupled to the plurality of sensors, the computing system configured to determine whether the user of the firearm is authorized to operate the firearm based on the profile information of the user of the firearm and pre-stored authorized profile database; an actuator coupled to the computing system; a first connecting structure mechanically coupled to the actuator; a second connecting structure mechanically coupled to the first connecting structure; and a third connecting structuring mechanically coupled to the second connecting structure, wherein the computing system is further configured to generate a control instruction following determining whether the user of the firearm is authorized to operate the firearm, the computing system is further configured to transmit the control instruction to the actuator, wherein a first end of the first connecting structure is mechanically coupled to the actuator, the actuator being configured to cause movement of the first end of the first connecting structure toward a first direction or opposite to the first direction based on the control instruction received from the computing system, wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction, wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and wherein the second end of the third connecting structure does not block the pathway of the trigger of the firearm after the actuator causes the first end of the first connecting structure to move toward the first direction.

In an exemplary example, there is provided a method comprising: receiving, by a button, a first pressure to unlock a firearm from a user of the firearm; transmitting, to the user, a request to verify the user's identity; collecting, by a plurality of sensors, profile information of the user of the firearm; deterring, by a computing system, whether the user of the firearm is authorized to operate the firearm based on the profile information of the user of the firearm and pre-stored authorized profile database; when it is determined that the user of the firearm is authorized to operate the firearm, causing, by the computing system, an actuator to move a first end of a first connecting structure toward a first direction, wherein the first end of the first connecting structure is mechanically coupled to the actuator, wherein a second end of the first connecting structure is mechanically coupled to a second connecting structure, wherein a first end of the third connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, thereby unlocking the firearm by pulling a second end of the third connecting structure away from a trigger of the firearm, receiving, by the button, a second pressure to lock the firearm from the user of the firearm; and causing, by the computing system, the actuator to move the first end of the first connecting structure toward opposite to the first direction, causing the second connecting structure to move along the track toward opposite to the second direction perpendicular to the first direction, thereby locking the firearm by pushing the second end of the third connecting structure against the trigger of the firearm.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 1:
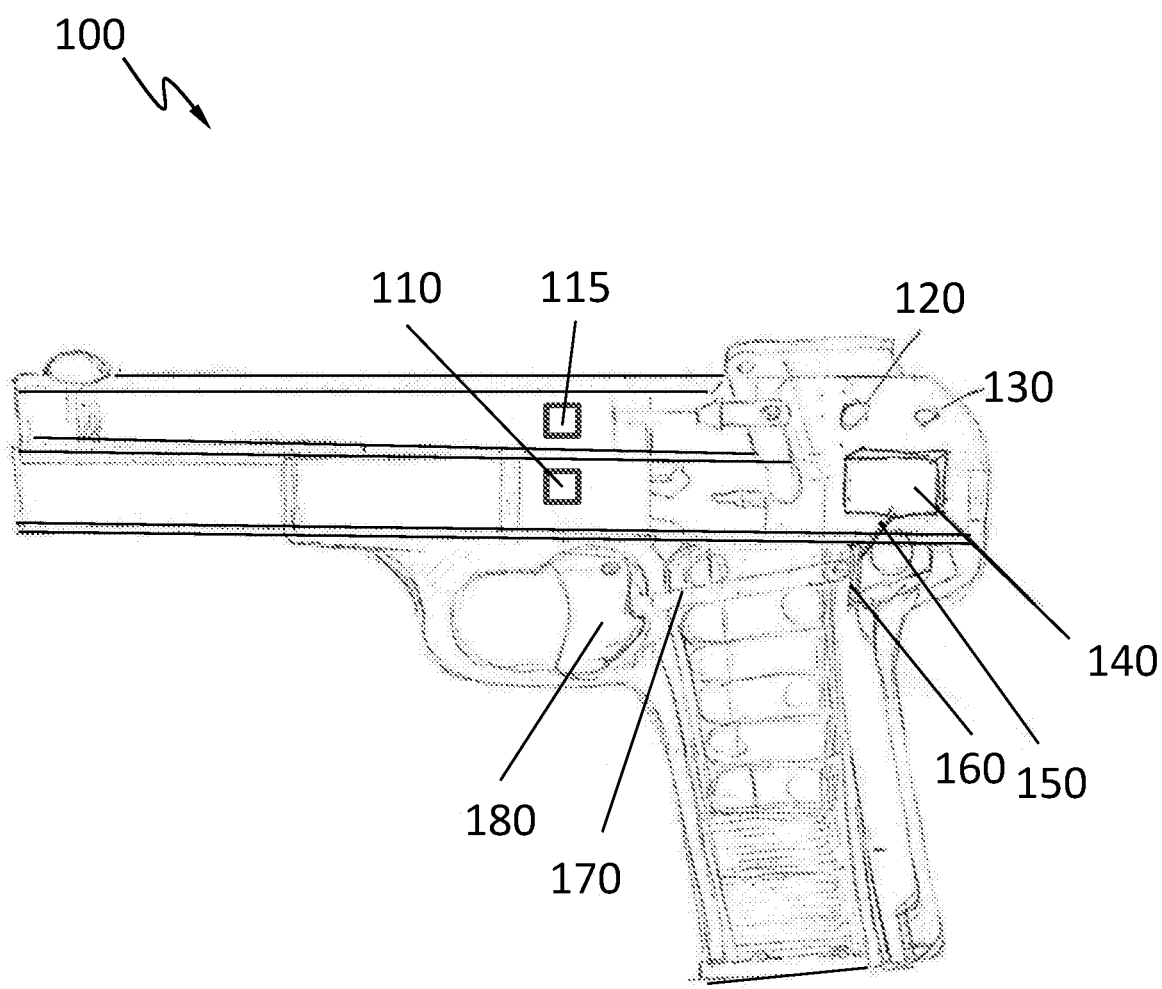
FIG. 1 is a schematic diagram of a firearm using a gun lock according to an embodiment of the present disclosure.
Figure 2:
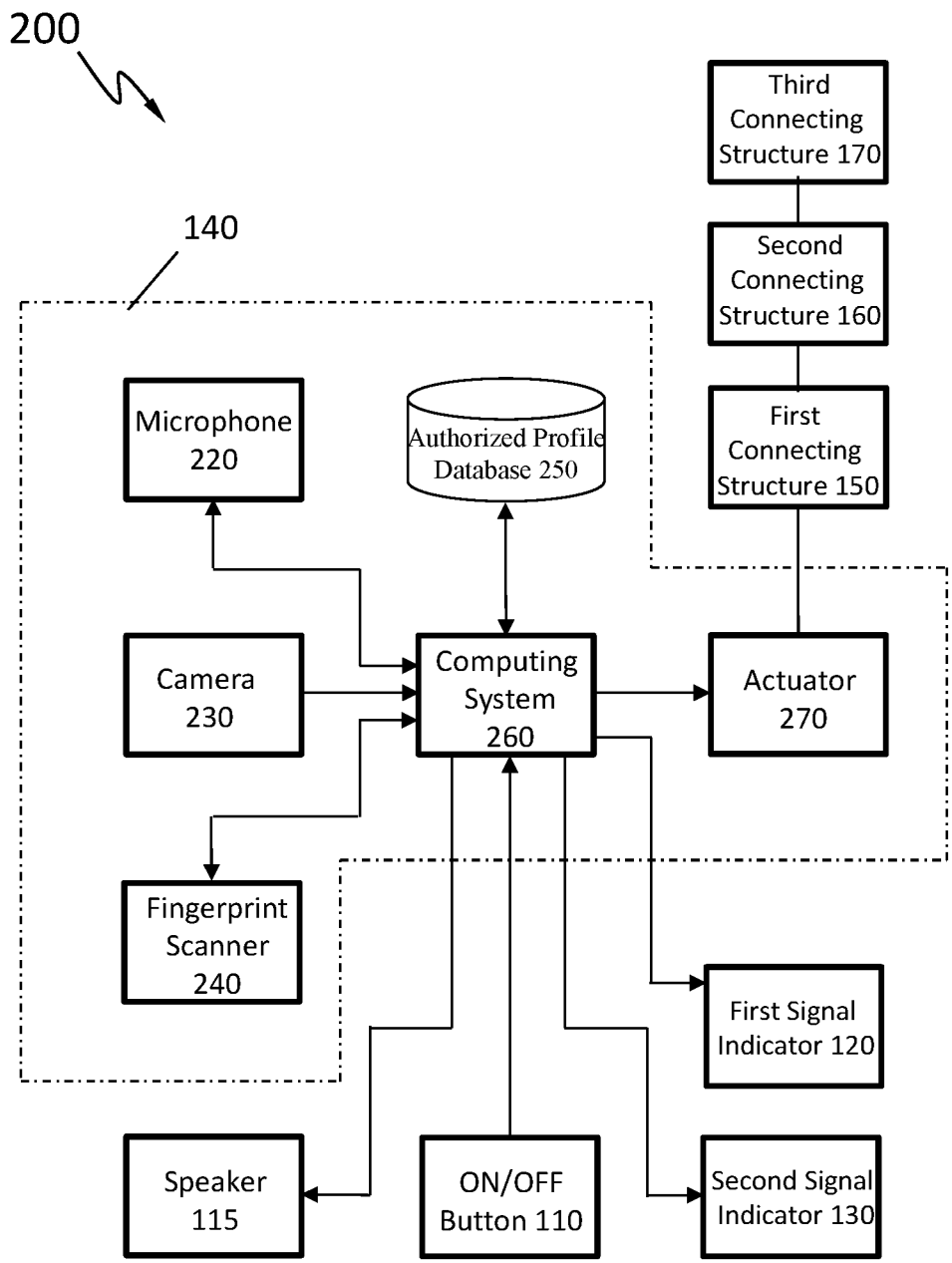
FIG. 2 is a schematic diagram of a gun lock according to an embodiment of the present disclosure.

Referring to FIG. 1, a schematic diagram of a firearm 100 using a gun lock is depicted according to an embodiment of the present disclosure. In addition to various components included in a regular firearm, the firearm 100 includes an on/off button 110, a speaker 115, a controller 140, a first connecting structure 150, a second connecting structure 160, a third connecting structure 170, a first signal indicator 120, and a second signal indicator 130. The components may be collectively referred to as a gun lock (i.e., the gun lock 200 as shown in FIG. 2). Further, these components may be arranged as shown or in any other suitable manner.

The on/off button 110 is configured to receive a pressure from a user of the firearm 100. In an embodiment, a short pressure (for example, which lasts for fewer than 5 seconds) received by the on/off button 110 from the user may indicate the user's desire to unlock the firearm 100 when the firearm 100 is locked, or lock the firearm 100 when the firearm 100 is unlocked. In an embodiment, a long pressure (for example, which lasts for 5 seconds or more) received by the on/off button 110 from the user may indicate the user's desire to add a new authorized user of the firearm 100 by the owner of the firearm 100 and/or an existing authorized user of the firearm 100. In an embodiment, at the first time use of the firearm 100, the user of the firearm 110 is considered the owner of the firearm 110. Accordingly, either the short pressure or the long pressure received by the on/off button 110 from the owner of the firearm 100 at the first time use of the firearm 110 may indicate the owner's desire to have himself as the first authorized user of the firearm 100.

The controller 140 is coupled to the on/off button 110 and is configured to determine whether the user of the firearm 100, who pressed the on/off button 110 when the firearm 100 is locked, is authorized to operate the firearm 100. In an embodiment, the controller 140 may be configured to make the determination based on profile information collected from the user of the firearm 100 using a plurality of sensors with the aid of the speaker 115. In an embodiment, the speaker 115 may be configured to transmit to the user of the firearm 100 one or more requests to provide the profile information for verification of the user's identity. The speaker 115 will be discussed in greater details with regard to FIG. 2.

The controller 140 is further configured to unlock the firearm 100 by causing movement of the first connecting structure 150 upon determining the user of the firearm 100 is authorized to operate the firearm 100 when the firearm 100 is locked. As shown in FIG. 1, the first connecting structure 150 is coupled to the controller 140 and the second connecting structure 160, the second connecting structure 160 is coupled to the first connecting structure 150 and the third connecting structure 170, and the third connecting structure 170 is coupled to the second connecting structure 160. Therefore, when the first connecting structure 150 is caused by the controller 140 to move, the second connecting structure 160 and the third connecting structure 170 moves subsequently. Also as shown in FIG. 1, the third connecting structure 170 is against a trigger 180 of the firearm 100, thus blocking the pathway of the trigger 180. This suggests that the firearm 100 is locked. The firearm 100 may be unlocked when the controller 140 causes the movement of the first connecting structure 150 in a first direction so that the third connecting structure 170 is pulled away from the trigger 180 until the pathway of the trigger 180 is cleared (not blocked by the third connecting structure 170). The firearm 100 may be locked again when the controller 140 causes the movement of the first connecting structure 150 in a direction opposite to the first direction so that the third connecting structure 170 is pushed toward the trigger 180 until the third connecting structure 170 is pushed against the trigger 180 and blocking the pathway of the trigger 180. Configuration of the controller 140 will be discussed in great details in FIG. 2. The working principles of unlocking and locking the firearm 100 through the use of the controller 140, the first connecting structure 150, the second connecting structure 160, and the third connecting structure 170 will be discussed in further details in FIGS. 3A and 3B.

In an embodiment, the first connecting structure 150, the second connecting structure 160, and the third connecting structure 170 are made wholly or at least in part of iron or steel. In an embodiment, the first connecting structure 150, the second connecting structure 160, and the third connecting structure 170 are either slabs or sticks. In an embodiment, the couplings between the first connecting structure 150 and the controller 140, between the first connecting structure 150 and the second connecting structure 160, and between the second connecting structure 160 and the third connecting structure 170 are accomplished by soldering, through bolts, or any other suitable means.

In an embodiment, the first signal indicator 120 and the second signal indicator 130 are configured to indicate the status of the firearm 100, specifically, whether the firearm 100 is locked or unlocked. When the firearm 100 is locked, the first signal indicator 120 is turned on and is configured to emit red light beams as the second signal indicator 130 is turned off. When the firearm 100 is unlocked, the second signal indicator 130 is turned on and is configured to emit green light beams as the first signal indicator 120 is turned off.

Referring to FIG. 2, a schematic diagram of the gun lock 200 is depicted according to an embodiment of the present disclosure. As shown, the gun lock 200 includes the controller 140, the on/off button 110, the speaker 115, the first signal indicator 120, the second signal indicator 130, the first connecting structure 150, the second connecting structure 160, and the third connecting structure 170. Specifically, the controller 140 includes a plurality of sensors configured to collect profile information of the user of the firearm 100. The profile information of the user of the firearm 100 is information that characterizes the identity of the user. Examples of the plurality of sensors includes a microphone 220, a camera 230, and a fingerprint scanner 240. The microphone 220 is configured to receive an audio input (for example, sound) from the user of the firearm. The camera 230 is configured to receive a facial image of the user of the firearm 100. The fingerprint scanner 240 is configured to receive a fingerprint image of the user of the firearm 100.

The controller 140 further includes a computing system 260 coupled to the plurality of sensors, the on/off button 110, the first signal indicator 120 and the second signal indicator 130. The controller 140 further includes an authorized profile database 250 accessible by the computing system 260, and an actuator 270 coupled to the computing system 260 and the first connecting structure 150.

The authorized profile database 250 stores profile information of people who are authorized by the owner of the firearm 100 to use the firearm 100. In an embodiment, the people who are authorized to use the firearm 100 by the owner of the firearm 100 may also be referred to as authorized users of the firearm 100. In an embodiment, the people who are authorized to use the firearm 100 by the existing authorized users of the firearm 100 may also be referred to as authorized users of the firearm 100. Accordingly, people who are not authorized to use the firearm 100 by either the owner or other authorized users may be referred to as unauthorized users of the firearm 100. The profile information of the authorized users may include, but not limited to, the audio information (for example, sound), the facial images, and the fingerprints of the authorized users. In an embodiment, the profile information of the authorized users may be collected at the first time use of the firearm 100. For example, upon purchasing the firearm 100, the owner of the firearm 100 may press the on/off button 100. Subsequently, the plurality of sensors including the microphone 220, the camera 230, and the fingerprint scanner 240 may collect the profile information of the owner of the firearm 100. Then the computing system 260 may receive the profile information of the owner of the firearm 100 and store the profile information of the owner in the authorized profile database 250. In an embodiment, any user of the firearm 100 when the firearm 100 is unlocked is considered an authorized user. Accordingly, the profile information of the authorized users may be collected, stored and updated in the authorized profile database 250 upon receipt of the long pressure by the on/off button from the authorized users when the firearm 100 is unlocked. For example, when the firearm 100 is unlocked and a long pressure (for example, which lasts for 5 seconds or more) is received by the on/off button 110 from the owner or any other user, the plurality of sensors including the microphone 220, the camera 230, and the fingerprint scanner 240 may collect the profile information of a newly authorized user of the firearm 100. Then the computing system 260 may receive the profile information of the newly authorized user of the firearm 100 and store the profile information of the newly authorized user in the authorized profile database 250.

The computing system 260 is configured to receive the profile information of the user of the firearm 100 from the plurality of sensors including the microphone 220, the camera 230, and the fingerprint scanner 240. Examples of the profile information of the user of the firearm 100 may include a sound, a facial image, and one or more fingerprints of the user of the firearm 100. The computing system 260 may be further configured to determine whether the user of the firearm 100 is authorized to operate the firearm based on the profile information of the user of the firearm 100 collected by the plurality of sensors and the pre-stored authorized profile database 250. In an embodiment, the artificial intelligence technologies, for example, based on deep neural network or convolutional neural network, may be used to make such determination. In an embodiment, the speaker 115 is used to transmit a request to the user of the firearm 100 to provide a specific type of profile information (for example, the sound, the facial image, or the fingerprint) before collecting the specific type of profile information using the corresponding sensor, for example, the microphone 220, the camera 230, or the fingerprint scanner 230. In an embodiment, the computing system 260 may be configured to determine whether the user of the firearm 100 is authorized to operate the firearm when all types of the profile information of the user of the firearm 100 are collected. In an embodiment, the computing system 260 may be configured to verify the identity of the user of the firearm 100 when each type of the profile information of the user is collected. In this embodiment, the computing system 260 may be configured to instruct the speaker 115 to request the user of the firearm 100 to provide the next type of profile information only when the computing system 260 has determined the current type of profile information is provided from an authorized user. In an embodiment, the different types of the profile information may be collected from the same user of the firearm 100. In an embodiment, each of the different types of the profile information may be collected from a different user of the firearm 100.

When the computing system 260 determines that the user of the firearm 100 is an authorized user of the firearm 100, the computing system 260 may further generate a first control instruction and transmit the first control instruction to the actuator 270 indicating to unlock the firearm 260. When the computing system 260 determines that the user of the firearm 100 is not an authorized user of the firearm 100, the computing system 260 will not instruct the actuator 270 to unlock the firearm 260. In an embodiment, when the firearm 100 is unlocked, a short pressure (for example, which lasts for fewer than 5 seconds) is received by the on/off button 110 from the user of the firearm 260. Accordingly, the computing system 260 will generate a second control instruction and transmit the second control instruction to the actuator 270 indicating to lock the firearm 100. In an embodiment, both the first control instruction and the second control instruction are, or can be denoted by, binary signals. For example, the first control instruction is a high voltage, denoted by "1," as the second control instruction is a low voltage, denoted by "0." In some other examples, the first control instruction is a low voltage, denoted by "0," as the second control instruction is a high voltage, denoted by "1."

Figure 3A:
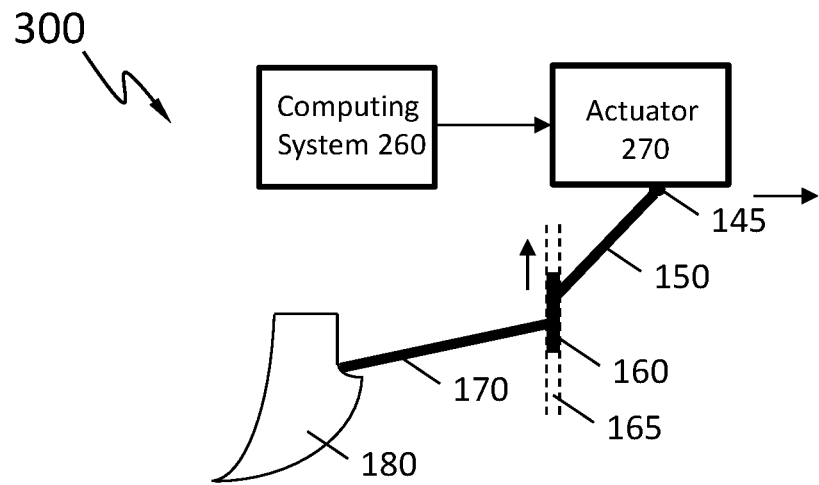
FIG. 3A shows a first operating state of a gun lock when a firearm is locked according to an embodiment of the present disclosure.
Figure 3B:
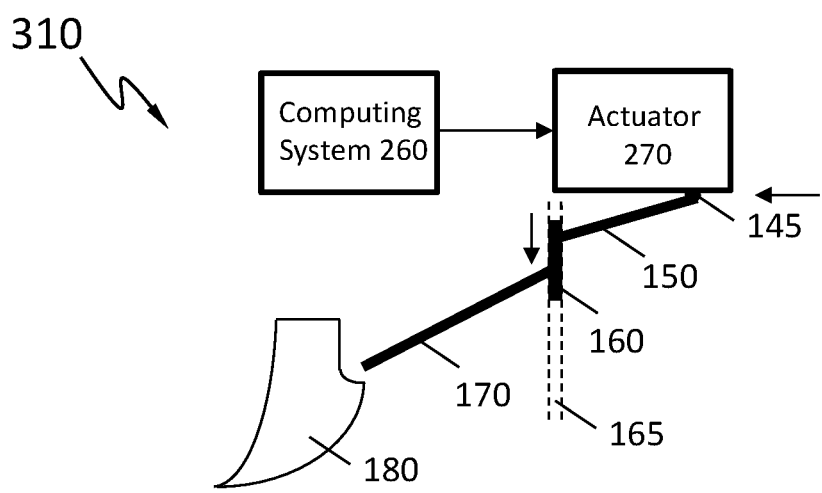
FIG. 3B shows a second operating state of a gun lock when a firearm is unlocked according to an embodiment of the present disclosure.

The actuator 270 is mechanically coupled (for example, by links with zero degrees of relative freedom) to the first connecting structure 150, specifically the first end 145 of the first connecting structure 150 as described in details in FIGS. 3A and 3B. In an embodiment, the actuator 260 may be a piezo-electric linear actuator. In an embodiment, the actuator 260 may be configured to cause the first end 145 of the first connecting structure 150 to move toward an appropriate direction so that the third connecting structure 170, which is coupled to the first connecting structure 150 through the second connecting structure 160, may be either pulled away from the trigger 180 of the firearm 100 to unlock the firearm 100 or pushed against the trigger 180 of the firearm 100 to lock the firearm 100. Piezo-electric linear actuators are expected to be relatively fast, responsive, and accurate for relatively small ranges of movement used in many contemplated use cases. But it should be noted that embodiments are consistent with a variety of different other types of actuators, such as other linear actuators, like squiggle motors, comb drives, screw drives, and the like. In an embodiment, the actuator 260 is an electro-magnetic valve.

Referring to FIG. 3A, a graph 300 illustrating a first operating state of the gun lock 200 is depicted according to an embodiment of the present disclosure. As shown in FIG. 3A, the firearm 100 is locked with the first operating state of the gun lock 200. This is because the pathway of the trigger 180 is blocked by the third connecting structure 180. Also as shown in FIG. 3A, the actuator 270 is mechanically coupled to the first connecting structure 150 through the first end 145 of the first connecting structure 150, the first connecting structure 150 is mechanically coupled to the second connecting structure 160, and the second connecting structure 160 is mechanically coupled to the third connecting structure 170.

Upon receipt, from the computing system 260, of the first control instruction indicating to unlock the firearm 100, the actuator 270 may cause movement of the first end 145 of the first connecting structure 150 toward a first direction denoted by the horizontal arrow in FIG. 3A. Because the second connecting structure 160 is mounted on a track oriented perpendicular to the first direction, the movement of the first end of the first connecting structure 150 toward the first direction subsequently causes the second connecting structure 160 to move toward a second direction denoted by the vertical arrow in FIG. 3A, thereby subsequently pulling the third connecting structure 170 away from the trigger 180 until the gun lock 200 reaches a second operating state as shown in FIG. 3B, when the firearm 100 is unlocked.

Referring to FIG. 3B, a graph 310 illustrating the second operating state of the gun lock 200 is depicted according to an embodiment of the present disclosure. As shown in FIG. 3B, the firearm 100 is unlocked with the second operating state of the gun lock 200. This is because the pathway of the trigger 180 is cleared (not blocked by the third connecting structure 180).

Upon receipt, from the computing system 260, of the second control instruction indicating to lock the firearm 100, the actuator 270 may cause movement of the first end 145 of the first connecting structure 150 toward a direction, denoted by the horizontal arrow in FIG. 3B, which is opposite to the first direction, denoted by the horizontal arrow in FIG. 3A. Because the second connecting structure 160 is mounted on the track oriented perpendicular to the first direction, the movement of the first end of the first connecting structure 150 toward opposite to the first direction subsequently causes the second connecting structure 160 to move toward a direction, denoted by the vertical arrow in FIG. 3B, which is opposite to the second direction denoted by the vertical arrow in FIG. 3A, thereby subsequently pushing the third connecting structure 170 toward the trigger 180 until the gun lock 200 reaches the first operating state as shown in FIG. 3A, when the firearm 100 is locked.

Figure 4:
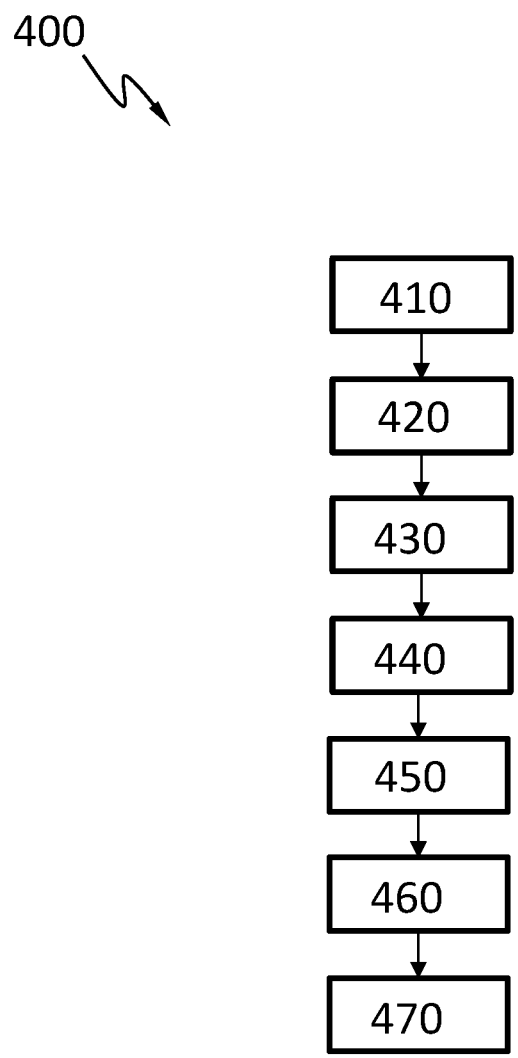
FIG. 4 is a flowchart of an exemplary process for operating a gun lock according to an embodiment of the disclosure.

Referring to FIG. 4, a flowchart 400 of an exemplary process for operating a gun lock is depicted according to an embodiment of the disclosure. In an embodiment, the exemplary process is performed by the gun lock 200 used in the firearm 100.

At step 410, a first pressure indicating to unlock a firearm is received by a button from a user of the firearm when the firearm is locked. In an embodiment, the button is the on/off button 110 in FIGS. 1-2. In an embodiment, the pressure lasts for fewer than 5 seconds.

At step 420, a request to verify the user's identity is transmitted to the user of the firearm. In an embodiment, the request may be transmitted to the user through a speaker (for example, the speaker 115 in FIGS. 1 and 2). In an embodiment, the request may be transmitted to the user by flashing the red light beams emitted by the first signal indicator 120 as shown in FIGS. 1-2.

At step 430, profile information of the user of the firearm is collected by a plurality of sensors. In an embodiment, the profile information of the user of the firearm is information that characterizes the identity of the user of the firearm. In an embodiment, the plurality of sensors includes a microphone (for example, the microphone 220) coupled to a computing system (for example, the computing system 260) and configured to receive an audio input (for example, sound) from the user of the firearm. In an embodiment, the plurality of sensors includes a camera (for example, the camera 230) coupled to the computing system (for example, the computing system 260) and configured to receive a facial image of the user of the firearm. In an embodiment, the plurality of sensors includes a fingerprint scanner (for example, the fingerprint scanner 240) coupled to the computing system (for example, the computing system 260) and configured to receive a fingerprint image of the user of the firearm.

At step 440, it is determined, by the computing system, whether the user of the firearm is authorized to operate the firearm based on the profile information of the user of the firearm and pre-stored authorized profile database. In an embodiment, artificial intelligence technologies may be used to determine whether the user of the firearm is authorized to operate the firearm based on the profile information of the user of the firearm collected by the plurality of sensors and the pre-stored authorized profile database. In an embodiment, the pre-stored authorized profile database includes profile information of people who are authorized by an owner or a preceded authorized user of the firearm to use the firearm.

At step 450, when it is determined that the user of the firearm is authorized to operate the firearm, an actuator is caused, by the computing system, to move a first end of a first connecting structure (for example, the first end 145 of the first connecting structure 150 in FIGS. 3A and 3B) toward a first direction (for example, the horizontal arrow in FIG. 3A). In an embodiment, the first end of the first connecting structure is mechanically coupled to the actuator (for example, the actuator 270). In an embodiment, a second end of the first connecting structure is mechanically coupled to a second connecting structure (for example, the second connecting structure 160). In an embodiment, a first end of the third connecting structure (for example, the third connecting structure 170) is mechanically coupled to the second connecting structure. In an embodiment, the second connecting structure is mounted on a track (for example, the track 165) oriented perpendicular to the first direction so that moving the first connecting structure toward the first direction causes the second connecting structure to move along the track toward a second direction perpendicular to the first direction, thereby unlocking the firearm by pulling a second end of the third connecting structure away from a trigger of the firearm (for example, the trigger 180 of the firearm 100 in FIGS. 1, 3A, and 3B) until the pathway of the trigger is clear (not blocked by the third connecting structure).

At step 460, a second pressure is received, by the button, from the user of the firearm when the firearm is unlocked. In an embodiment, the button is the on/off button 110 in FIGS. 1-2. In an embodiment, the second pressure lasts for fewer than 5 seconds.

At step 470, the actuator is caused, by the computing system, to move the first end of the first connecting structure toward opposite to the first direction. This subsequently causes the second connecting structure to move along the track toward opposite to the second direction perpendicular to the first direction, thereby locking the firearm by pushing the second end of the third connecting structure toward the trigger of the firearm (for example, the trigger 180 of the firearm 100 in FIGS. 1, 3A, and 3B) until the third connecting structure pushed against the trigger of the firearm and blocks the pathway of the trigger of the firearm.

In an embodiment, there is provided a gun lock of a firearm, the gun lock comprising: a plurality of sensors configured to collect profile information of a user of the firearm; a computing system coupled to the plurality of sensors, the computing system configured to determine whether the user of the firearm is authorized to operate the firearm based on the profile information of the user of the firearm and pre-stored authorized profile database; an actuator coupled to the computing system; a first connecting structure mechanically coupled to the actuator; a second connecting structure mechanically coupled to the first connecting structure; and a third connecting structuring mechanically coupled to the second connecting structure, wherein the computing system is further configured to generate a control instruction following determining whether the user of the firearm is authorized to operate the firearm, the computing system is further configured to transmit the control instruction to the actuator, wherein a first end of the first connecting structure is mechanically coupled to the actuator, the actuator being configured to cause movement of the first end of the first connecting structure toward a first direction or opposite to the first direction based on the control instruction received from the computing system, wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction, wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and wherein the second end of the third connecting structure does not block the pathway of the trigger of the firearm after the actuator causes the first end of the first connecting structure to move toward the first direction.

In an embodiment, the computing system is configured to use artificial intelligence technologies to determine whether the user of the firearm is authorized to operate the firearm based on the profile information of the user of the firearm collected by the plurality of sensors and the pre-stored authorized profile database, and wherein the pre-stored authorized profile database comprises profile information of people who are authorized by an owner of the firearm to use the firearm.

In an embodiment, the plurality of sensors comprises: a microphone coupled to the computing system and configured to receive an audio input from the user of the firearm; a camera coupled to the computing system and configured to receive a facial image of the user of the firearm; and a fingerprint scanner coupled to the computing system and configured to receive a fingerprint image of the user of the firearm.

In an embodiment, the gun lock further comprises a button coupled to the computing system, wherein the button is configured to receive a pressure from the user of the firearm, and wherein, upon receipt of the pressure when the firearm is unlocked, the computing system is configured to transmit the control instruction to the actuator to cause the first end of the first connecting structure to move toward opposite to the first direction.

In an embodiment, the gun lock further comprises a first signal indicator configured to emit a red light beam when the firearm is locked.

In an embodiment, the gun lock further comprises a second signal indicator configured to emit a green light beam when the firearm is unlocked.

In an embodiment, the actuator comprises an electromagnetic valve.

In an embodiment, there is provided a firearm with a gun lock, the gun lock comprising: a plurality of sensors configured to collect profile information of a user of the firearm; a computing system coupled to the plurality of sensors, the computing system configured to determine whether the user of the firearm is authorized to operate the firearm based on the profile information of the user of the firearm and pre-stored authorized profile database; an actuator coupled to the computing system; a first connecting structure mechanically coupled to the actuator; a second connecting structure mechanically coupled to the first connecting structure; and a third connecting structuring mechanically coupled to the second connecting structure, wherein the computing system is further configured to generate a control instruction following determining whether the user of the firearm is authorized to operate the firearm, the computing system is further configured to transmit the control instruction to the actuator, wherein a first end of the first connecting structure is mechanically coupled to the actuator, the actuator being configured to cause movement of the first end of the first connecting structure toward a first direction or opposite to the first direction based on the control instruction received from the computing system, wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction, wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and wherein the second end of the third connecting structure does not block the pathway of the trigger of the firearm after the actuator causes the first end of the first connecting structure to move toward the first direction.

In an embodiment, the computing system is configured to use artificial intelligence technologies to determine whether the user of the firearm is authorized to operate the firearm based on the profile information of the user of the firearm collected by the plurality of sensors and the pre-stored authorized profile database, and wherein the pre-stored authorized profile database comprises profile information of people who are authorized by an owner of the firearm to use the firearm.

In an embodiment, the plurality of sensors comprises: a microphone coupled to the computing system and configured to receive an audio input from the user of the firearm; a camera coupled to the computing system and configured to receive a facial image of the user of the firearm; and a fingerprint scanner coupled to the computing system and configured to receive a fingerprint image of the user of the firearm.

In an embodiment, the gun lock further comprises a button coupled to the computing system, wherein the button is configured to receive a pressure from the user of the firearm, and wherein, upon receipt of the pressure when the firearm is unlocked, the computing system is configured to transmit the control instruction to the actuator to cause the first end of the first connecting structure to move toward opposite to the first direction.

In an embodiment, the gun lock further comprises a first signal indicator configured to emit a red light beam when the firearm is locked.

In an embodiment, the gun lock further comprises a second signal indicator configured to emit a green light beam when the firearm is unlocked.

In an embodiment, the actuator comprises an electromagnetic valve.

In an embodiment, there is provided a method comprising: receiving, by a button, a first pressure to unlock a firearm from a user of the firearm; transmitting, to the user, a request to verify the user's identity; collecting, by a plurality of sensors, profile information of the user of the firearm; determining, by a computing system, whether the user of the firearm is authorized to operate the firearm based on the profile information of the user of the firearm and pre-stored authorized profile database; when it is determined that the user of the firearm is authorized to operate the firearm, causing, by the computing system, an actuator to move a first end of a first connecting structure toward a first direction, wherein the first end of the first connecting structure is mechanically coupled to the actuator, wherein a second end of the first connecting structure is mechanically coupled to a second connecting structure, wherein a first end of the third connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, thereby unlocking the firearm by pulling a second end of the third connecting structure away from a trigger of the firearm; receiving, by the button, a second pressure to lock the firearm from the user of the firearm; and causing, by the computing system, the actuator to move the first end of the first connecting structure toward opposite to the first direction, causing the second connecting structure to move along the track toward opposite to the second direction perpendicular to the first direction, thereby locking the firearm by pushing the second end of the third connecting structure against the trigger of the firearm.

In an embodiment, the method further comprises using artificial intelligence technologies to determine whether the user of the firearm is authorized to operate the firearm based on the profile information of the user of the firearm collected by the plurality of sensors and the pre-stored authorized profile database, wherein the pre-stored authorized profile database comprises profile information of people who are authorized by an owner of the firearm to use the firearm.

In an embodiment, the plurality of sensors comprises: a microphone coupled to the computing system and configured to receive an audio input from the user of the firearm; a camera coupled to the computing system and configured to receive a facial image of the user of the firearm; and a fingerprint scanner coupled to the computing system and configured to receive a fingerprint image of the user of the firearm.

In an embodiment, the method further comprises emitting, by a first signal indicator, a red light beam when the firearm is locked.

In an embodiment, the method further comprises emitting, by a second signal indicator, a green light beam when the firearm is unlocked.

In an embodiment, the actuator comprises an electromagnetic valve.

Figure 5:
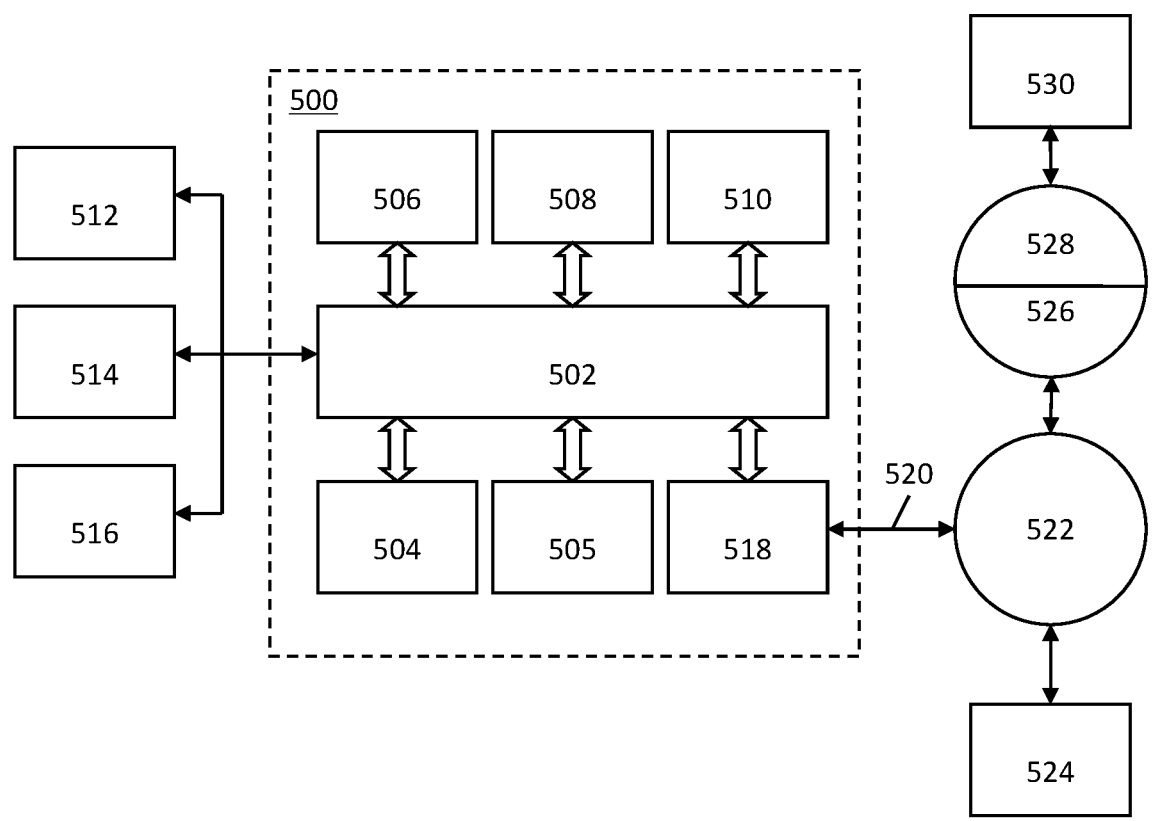
FIG. 5 depicts a general computer architecture on which a computing system in the present disclosure can be implemented.

Referring to FIG. 5, a computer system 500 is shown. In an embodiment, the computer system is the computing system 260. The computer system 500 includes a bus 502 or other communication mechanism to communicate information, and a processor 504 (or multiple processors 504 and 505) coupled with the bus 502 to process information. In an embodiment, the computer system 500 includes a main memory 506, such as a random access memory (RAM) or other dynamic storage device, coupled to the bus 502 to store information and instructions to be executed by the processor 504. In an embodiment, the owner profile database 250 is stored in the main memory 506. The main memory 506 may be used to store temporary variables or other intermediate information during execution of instructions to be executed by the processor 504. In an embodiment, the computer system 500 includes a read only memory (ROM) 508 or other static storage device coupled to the bus 502 to store essentially static information and instructions for the processor 504. In an embodiment, a storage device 510, such as a solid state drive, magnetic disk or optical disk, is provided and coupled to the bus 502 to store information and instructions.

The computer system 500 may be coupled via the bus 502 to a display 512, such as a cathode ray tube (CRT) or flat panel or touch panel display, to display information to a computer user. In an embodiment, an input device 514, including or providing alphanumeric and other keys, is coupled to the bus 502 to communicate information and command selections to the processor 504. Another type of user input device is a cursor controller 516, such as a mouse, a trackball, or cursor direction keys, to communicate direction information and command selections to the processor 504 and to control cursor movement on the display 512. A touch panel (screen) display may also be used as an input device.

The computer system 500 may be suitable to implement methods as described herein in response to the processor 504 executing one or more sequences of one or more instructions contained in, for example, the main memory 506. Such instructions may be read into the main memory 506 from another computer-readable medium, such as the storage device 510. In an embodiment, execution of sequences of instructions contained in the main memory 506 causes the processor 504 to perform process steps described herein. One or more processors in a multi-processing arrangement may be employed to execute the sequences of instructions contained in the main memory 506. In an embodiment, a hard-wired circuitry may be used in place of or in combination with software instructions. Thus, embodiments are not limited to any specific combination of hardware circuitry and software.

The term "computer-readable medium" as used herein refers to any medium that participates in providing instructions to the processor 504 for execution. Such a medium may take many forms, including but not limited to, non-volatile media, volatile media, and transmission media. Non-volatile media include, for example, solid state, optical or magnetic disks, such as the storage device 510. Volatile media include dynamic memory, such as the main memory 506. Non-volatile and volatile media are considered non-transitory. Non-transitory transmission media include coaxial cables, copper wire and fiber optics, including the wires that comprise the bus 502. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tapes, any other physical medium with patterns of holes, an RAM, a PROM, and EPROM, a FLASH-EPROM, a solid state disk or any other memory chip or cartridge, a carrier wave as described herein, or any other medium from which a computer can read.

Various forms of computer readable media may be involved in carrying one or more sequences of one or more instructions to the processor 504 for execution. For example, the instructions may initially be borne on a magnetic disk of a remote computer. The remote computer can load the instructions into its dynamic memory and send the instructions over communications medium (for example, by line or wireless). The computer system 500 can receive the transmitted data and place the data on the bus 502. The bus 502 carries the data to the main memory 506, from which the processor 504 retrieves and executes the instructions. The instructions received by the main memory 506 may optionally be stored on the storage device 510 either before or after execution by the processor 504.

The computer system 500 may also include a communication interface 518 coupled to the bus 502. The communication interface 518 provides a two-way data communication coupling to a network link 520 that is connected to a local network 522. For example, the communication interface 518 may be an integrated service digital network (ISDN) card or a modem to provide a data communication connection to a corresponding type of line. As another example, the communication interface 518 may be a local area network (LAN) card to provide a data communication connection to a compatible LAN. Wireless links may also be implemented. In any such implementation, the communication interface 518 sends and receives electrical, electromagnetic or optical signals that carry digital data streams representing various types of information.

The network link 520 typically provides data communication through one or more networks to other data devices. For example, the network link 520 may provide a connection through the local network 522 to a host computer 524 or to data equipment operated by an Internet Service Provider (ISP) 526. The ISP 526 in turn provides data communication services through the worldwide packet data communication network, commonly referred to as the internet 528. The local network 522 and the internet 528 both use electrical, electromagnetic or optical signals that carry digital data streams. The signals through the various networks and the signals on the network link 520 and through the communication interface 518, which carry the digital data to and from the computer system 500, are exemplary forms of carrier waves transporting the information.

The computer system 500 can send messages and receive data, including program code, through the network(s), the network link 520, and the communication interface 518. In the internet example, a server 530 might transmit a requested code for an application program through the internet 528, the ISP 526, the local network 522 and the communication interface 518. In accordance with one or more embodiments, one such downloaded application implements a method as described herein. The received code may be executed by the processor 504 as it is received, and/or stored in the storage device 510, or other non-volatile storage for later execution. In this manner, the computer system 500 may obtain application code.

An embodiment may take the form of a computer program containing one or more sequences of machine-readable instructions describing a method as disclosed herein, or a data storage medium (for example semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according to the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. A gun lock of a firearm, the gun lock comprising:
   a plurality of sensors configured to collect profile information of a user of the firearm;
   a computing system coupled to the plurality of sensors, the computing system configured to determine whether the user of the firearm is authorized to operate the firearm based on the profile information of the user of the firearm and pre-stored authorized profile database;
   an actuator coupled to the computing system;
   a first connecting structure mechanically coupled to the actuator;
   a second connecting structure mechanically coupled to the first connecting structure; and
   a third connecting structuring mechanically coupled to the second connecting structure,
   wherein the computing system is further configured to generate a control instruction following determining whether the user of the firearm is authorized to operate the firearm, the computing system is further configured to transmit the control instruction to the actuator,
   wherein a first end of the first connecting structure is mechanically coupled to the actuator, the actuator being configured to cause movement of the first end of the first connecting structure toward a first direction or opposite to the first direction based on the control instruction received from the computing system,
   wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction,
   wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and
   wherein the second end of the third connecting structure does not block the pathway of the trigger of the firearm after the actuator causes the first end of the first connecting structure to move toward the first direction.

2. The gun lock of claim 1, wherein the computing system is configured to use artificial intelligence technologies to determine whether the user of the firearm is authorized to operate the firearm based on the profile information of the user of the firearm collected by the plurality of sensors and the pre-stored authorized profile database, and wherein the pre-stored authorized profile database comprises profile information of people who are authorized by an owner of the firearm to use the firearm.

3. The gun lock of claim 2, the plurality of sensors comprising:
   a microphone coupled to the computing system and configured to receive an audio input from the user of the firearm;
   a camera coupled to the computing system and configured to receive a facial image of the user of the firearm; and
   a fingerprint scanner coupled to the computing system and configured to receive a fingerprint image of the user of the firearm.

4. The gun lock of claim 3, further comprising a button coupled to the computing system, wherein the button is configured to receive a pressure from the user of the firearm, and wherein, upon receipt of the pressure when the firearm is unlocked, the computing system is configured to transmit the control instruction to the actuator to cause the first end of the first connecting structure to move toward opposite to the first direction.

5. The gun lock of claim 4, further comprising a first signal indicator configured to emit a red light beam when the firearm is locked.

6. The gun lock of claim 5, further comprising a second signal indicator configured to emit a green light beam when the firearm is unlocked.

7. The gun lock of claim 6, wherein the actuator comprises an electro-magnetic valve.

8. A firearm with a gun lock, the gun lock comprising:
   a plurality of sensors configured to collect profile information of a user of the firearm;
   a computing system coupled to the plurality of sensors, the computing system configured to determine whether the user of the firearm is authorized to operate the firearm based on the profile information of the user of the firearm and pre-stored authorized profile database;

an actuator coupled to the computing system;
a first connecting structure mechanically coupled to the actuator;
a second connecting structure mechanically coupled to the first connecting structure; and
a third connecting structuring mechanically coupled to the second connecting structure,
wherein the computing system is further configured to generate a control instruction following determining whether the user of the firearm is authorized to operate the firearm, the computing system is further configured to transmit the control instruction to the actuator,
wherein a first end of the first connecting structure is mechanically coupled to the actuator, the actuator being configured to cause movement of the first end of the first connecting structure toward a first direction or opposite to the first direction based on the control instruction received from the computing system,
wherein a second end of the first connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, and moving the first connecting structure toward opposite of the first direction causes the second connecting structure to move along the track toward opposite to the second direction,
wherein a first end of the third connecting structure is mechanically coupled to the second connecting structure, wherein the second end of the third connecting structure blocks a pathway of a trigger of the firearm after the actuator causes the first end of the first connecting structure to move toward opposite to the first direction, and
wherein the second end of the third connecting structure does not block the pathway of the trigger of the firearm after the actuator causes the first end of the first connecting structure to move toward the first direction.

9. The firearm of claim 8, wherein the computing system is configured to use artificial intelligence technologies to determine whether the user of the firearm is authorized to operate the firearm based on the profile information of the user of the firearm collected by the plurality of sensors and the pre-stored authorized profile database, and wherein the pre-stored authorized profile database comprises profile information of people who are authorized by an owner of the firearm to use the firearm.

10. The firearm of claim 9, the plurality of sensors comprising:
a microphone coupled to the computing system and configured to receive an audio input from the user of the firearm;
a camera coupled to the computing system and configured to receive a facial image of the user of the firearm; and
a fingerprint scanner coupled to the computing system and configured to receive a fingerprint image of the user of the firearm.

11. The firearm of claim 10, the gun lock further comprising a button coupled to the computing system, wherein the button is configured to receive a pressure from the user of the firearm, and wherein, upon receipt of the pressure when the firearm is unlocked, the computing system is configured to transmit the control instruction to the actuator to cause the first end of the first connecting structure to move toward opposite to the first direction.

12. The firearm of claim 11, the fun lock further comprising a first signal indicator configured to emit a red light beam when the firearm is locked.

13. The firearm of claim 12, the gun lock further comprising a second signal indicator configured to emit a green light beam when the firearm is unlocked.

14. The firearm of claim 13, wherein the actuator comprises an electro-magnetic valve.

15. A method comprising:
receiving, by a button, a first pressure from a user of the firearm when a firearm is locked;
transmitting, to the user, a request to verify the user's identity;
collecting, by a plurality of sensors, profile information of the user of the firearm;
determining, by a computing system, whether the user of the firearm is authorized to operate the firearm based on the profile information of the user of the firearm and pre-stored authorized profile database;
when it is determined that the user of the firearm is authorized to operate the firearm, causing, by the computing system, an actuator to move a first end of a first connecting structure toward a first direction, wherein the first end of the first connecting structure is mechanically coupled to the actuator, wherein a second end of the first connecting structure is mechanically coupled to a second connecting structure, wherein a first end of the third connecting structure is mechanically coupled to the second connecting structure, the second connecting structure being mounted on a track oriented perpendicular to the first direction so that moving the first connecting structure toward the first direction causes the second connecting structure to move along the track toward a second direction perpendicular to the first direction, thereby unlocking the firearm by pulling a second end of the third connecting structure away from a trigger of the firearm,
receiving, by the button, a second pressure from the user of the firearm when the firearm is unlocked; and
causing, by the computing system, the actuator to move the first end of the first connecting structure toward opposite to the first direction, causing the second connecting structure to move along the track toward opposite to the second direction perpendicular to the first direction, thereby locking the firearm by pushing the second end of the third connecting structure against the trigger of the firearm.

16. The method of claim 15, further comprising using artificial intelligence technologies to determine whether the user of the firearm is authorized to operate the firearm based on the profile information of the user of the firearm collected by the plurality of sensors and the pre-stored authorized profile database, wherein the pre-stored authorized profile database comprises profile information of people who are authorized by an owner of the firearm to use the firearm.

17. The method of claim 16, the plurality of sensors comprising:
a microphone coupled to the computing system and configured to receive an audio input from the user of the firearm;
a camera coupled to the computing system and configured to receive a facial image of the user of the firearm; and
a fingerprint scanner coupled to the computing system and configured to receive a fingerprint image of the user of the firearm.

18. The method of claim 17, further comprising emitting, by a first signal indicator, a red light beam when the firearm is locked.

19. The method of claim 18, further comprising emitting, by a second signal indicator, a green light beam when the firearm is unlocked.

20. The method of claim 19, wherein the actuator comprises an electro-magnetic valve.

* * * * *